(No Model.)

E. H. ALLMAN.
LOG DOG.

No. 356,973. Patented Feb. 1, 1887.

WITNESSES:
Fred G. Dieterich
John C. Kennon

INVENTOR:
E. H. Allman
BY Munn & Co.
ATTORNEYS.

UNITED STATES PATENT OFFICE.

EUGENE HILLERY ALLMAN, OF MOBILE, ALABAMA.

LOG-DOG.

SPECIFICATION forming part of Letters Patent No. 356,973, dated February 1, 1887.

Application filed August 13, 1886. Serial No. 210,829. (No model.)

*To all whom it may concern:*

Be it known that I, EUGENE HILLERY ALLMAN, of Mobile, in the county of Mobile and State of Alabama, have invented a new and useful Improvement in Log-Dogs, of which the following is a specification.

My invention consists in an improved wrought-iron dog for applying to endless chains used in hauling up logs in saw-mills, and which will be hereinafter fully described and claimed.

Figure 1:
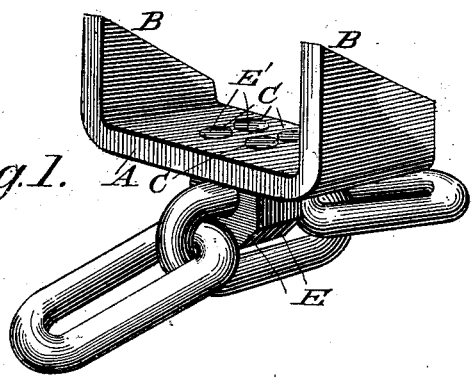
Figure 2:
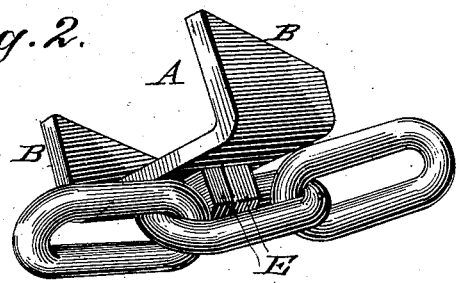
Figure 3:
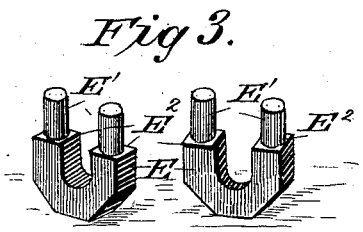

Referring to the accompanying drawings, Figure 1 is a perspective view of one of my improved dogs, showing the same secured in operative position to a link of a chain. Fig. 2 is a perspective view of the same, taken from the under side; and Fig. 3 is a perspective view of the clips which secure the dog to the link of the chain.

The same letters of reference indicate corresponding parts in all the figures.

My improved wrought-iron dog is made of heavy wrought-iron twelve inches long over all by six inches wide and one inch thick, being formed with the flat body portion A and the end fangs, B B, which are bent up at each end at right angles to the body portion, being beveled on their outer edges downwardly and rearwardly, so that the forward points of the fangs are three and one-half inches long, measured from the body portion of the dog, as shown. Four apertures, C C, are drilled in the middle portion of the dog, as shown, through which pass the ends of the clips which secure the dog to the chain. These clips E are U-shaped, as shown, and are formed with the reduced ends E', leaving the shoulders E², which bear against the lower side of the dog; and to secure the dogs in position on the endless chain the clips are passed around the links, as shown, and their reduced ends inserted through the apertures C in the body portion of the dogs and their ends welded, so as to form good heads, thereby securing the dogs solidly and strongly to the chains, the wrought-iron dogs being exceedingly strong, and will not break, as those made of cast-iron will.

It will be seen that by making the points or fangs with the rearwardly sloping or beveled edges the dog will relieve itself when returning. The dog is exceedingly strong and durable, and is easily applied to the chain by the shouldered clips, which fit closely around the link, as shown, and by its use all extra chains and dogs are dispensed with.

When my improved dogs are used on the endless chains, all that is required is to point the logs in the logway, when the dogs take hold and bring them up.

From the foregoing description, taken in connection with the accompanying drawings, the construction and advantages of my improved wrought-iron dogs will be readily understood. It will be seen that they are especially useful in handling heavy logs of any size.

Having thus described my invention, what I claim, and desire to secure by Letters Patent, is—

The combination, with the wrought-iron dog consisting of the flat body portion having the end points or fangs formed with the rearwardly-inclined edges, and having the apertures drilled in it, of the clips formed with the shoulders and the reduced ends, as and for the purpose shown and set forth.

EUGENE HILLERY ALLMAN.

Witnesses:
C. H. LINDSEY,
L. H. FAITH.